Feb. 23, 1937. C. R. HANNA 2,071,831
SHOCK ABSORBER
Original Filed Aug. 6, 1932 4 Sheets-Sheet 1

WITNESSES:
C.J.Weller
Paul E. Friedemann

INVENTOR
Clinton R. Hanna.
BY
W.R.Coley
ATTORNEY

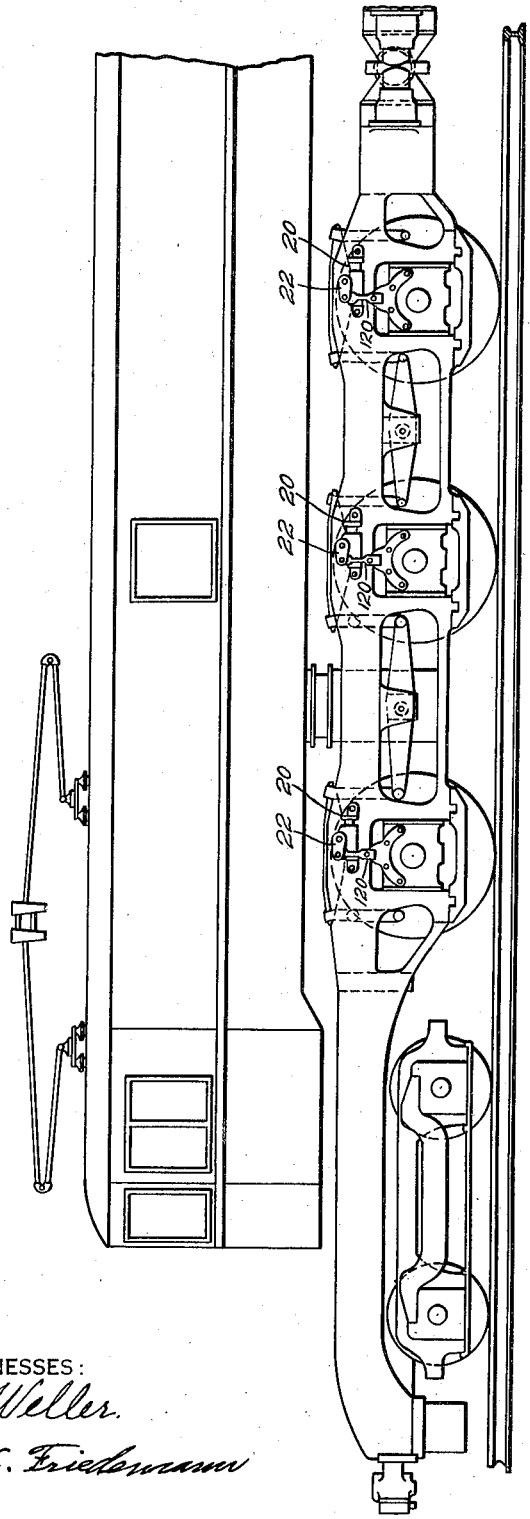

Feb. 23, 1937.                C. R. HANNA                2,071,831
                            SHOCK ABSORBER
              Original Filed Aug. 6, 1932    4 Sheets—Sheet 3
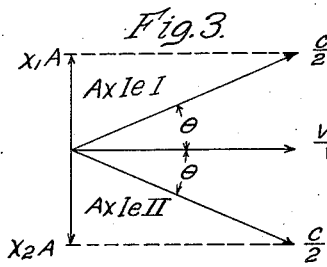
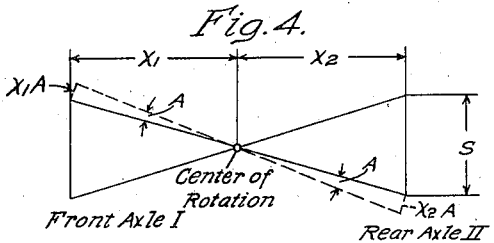
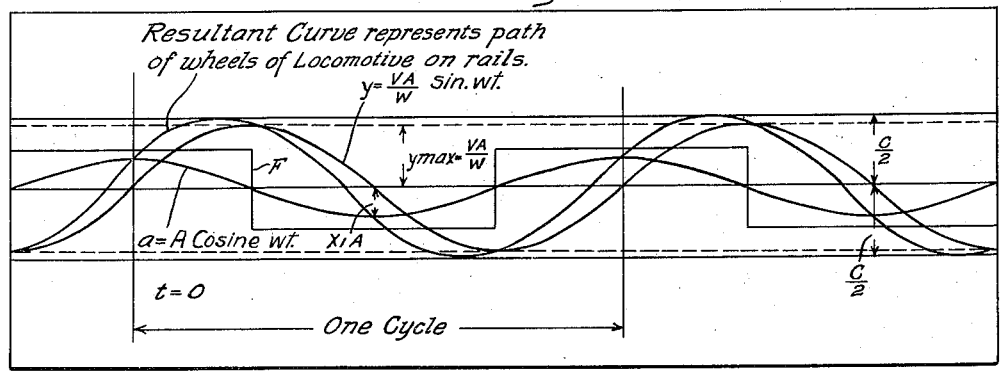
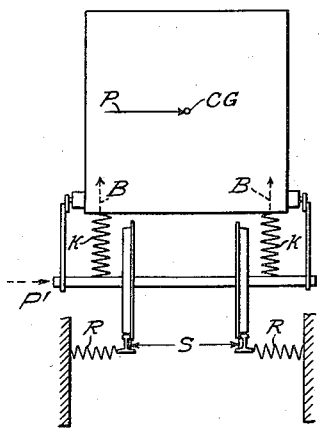
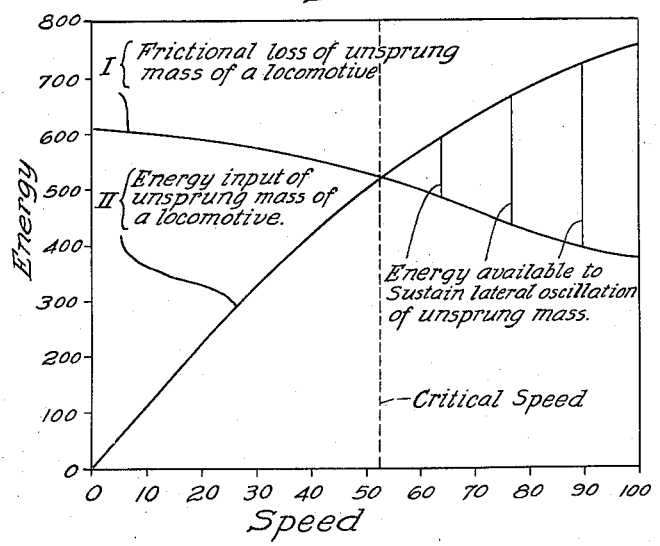
WITNESSES:                                    INVENTOR
                                              Clinton R. Hanna.
                                              BY
                                              ATTORNEY Feb. 23, 1937.   C. R. HANNA   2,071,831
SHOCK ABSORBER
Original Filed Aug. 6, 1932   4 Sheets-Sheet 4

WITNESSES:
C. J. Weller.
Paul E. Friedemann

INVENTOR
Clinton R. Hanna.
BY
W. R. Coley
ATTORNEY

Patented Feb. 23, 1937

2,071,831

UNITED STATES PATENT OFFICE 2,071,831

SHOCK ABSORBER

Clinton R. Hanna, Pittsburgh, Pa., assignor to Westinghouse Electric & Manufacturing Company, East Pittsburgh, Pa., a corporation of Pennsylvania Original application August 6, 1932, Serial No. 627,758. Divided and this application May 19, 1934, Serial No. 726,598

6 Claims. (Cl. 105—82)

My invention relates to shock absorbers for railway vehicles, and more particularly to devices to prevent the shocks and undesirable riding characteristics caused by the "nosing" habit of railway vehicles, in short, my invention relates to devices adapted to prevent "nosing".

This invention constitutes a part divided out of my application entitled Shock absorbers, filed on August 6, 1932, Serial No. 627,758.

In the following description, my shock absorber will be described in connection with a locomotive. However, it is to be understood that my shock absorber may be employed in connection with other vehicles operating on rails. In this description, the vehicle may be considered as having two main parts, which may, in the interest of clarity, be conveniently referred to as the sprung and the unsprung masses.

The sprung mass comprises that part of the vehicle which is supported by the springs, and the unsprung mass comprises the axle and wheels and any other parts that may be mounted thereon.

An object of my invention is the provision of a shock absorber that shall be reliable, compact, and efficient in operation, and shall be readily manufactured and installed.

Another object of my invention is the provision of shock absorbers which, when mounted, upon a locomotive or other rolling stock operating on rails, resist lateral oscillations of the unsprung mass of the locomotive, and thereby prevent the "nosing" action of the locomotive.

Another object of my invention is the provision of shock absorbers which, when mounted upon a locomotive or other rolling stock operating on a rails, allow the free movement of the wheels and which in no manner interfere with the spring equalizing system upon which the sprung mass of the locomotive is carried.

A still further object of my invention is the provision for controlling the operations of a shock absorber by means of a control mass having two degrees of freedom.

Other objects and a fuller understanding of my invention may be had by referring to the following specification taken in connection with the accompanying drawings, in which:

Fig. 2 is a side elevational view of part of an electric locomotive having shock absorbers mounted thereon to resist the lateral oscillations of the unsprung mass;

Fig. 3 is a vector diagram illustrating the phase relation between the rotational movements of the center line of the locomotive about the "center of rotation" and the lateral motion of the "center of rotation";

Figure 8:
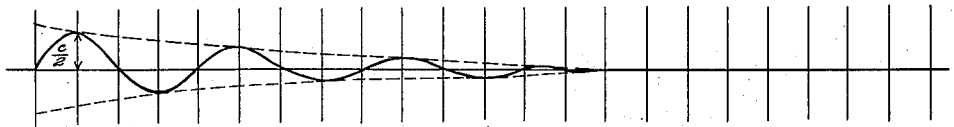
Figure 9:
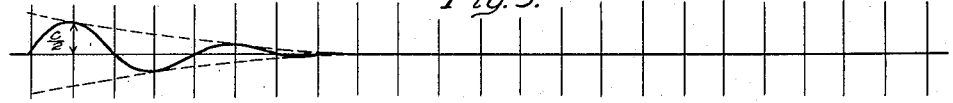
Figure 10:
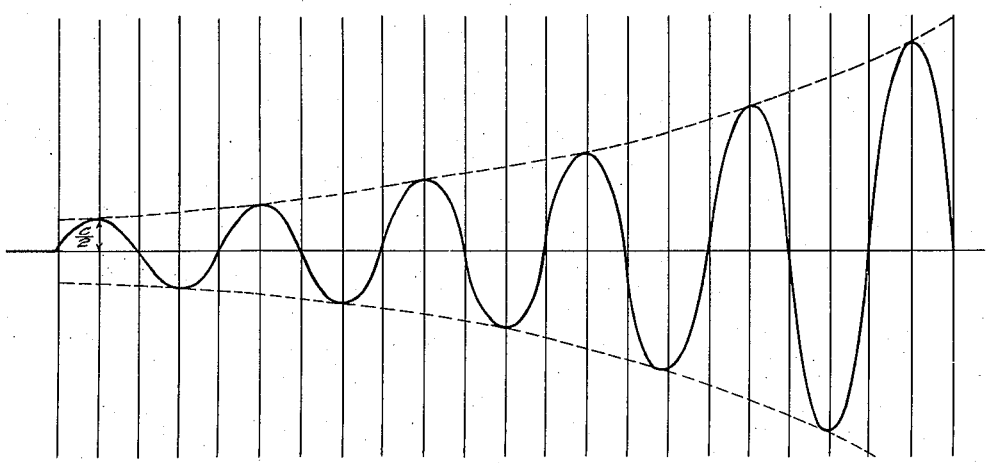
Figure 11:
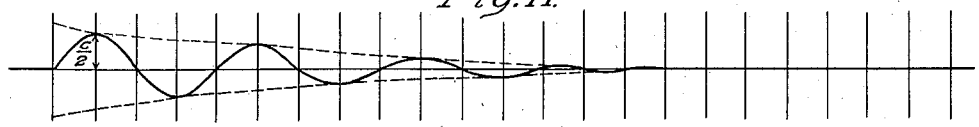
Figure 12:

Fig. 4 diagrammatically illustrates a two-wheel locomotive rotating about the "center of rotation";

Fig. 5 graphically illustrates the sinusoidal movement of the lateral oscillations of the unsprung mass of a locomotive moving longitudinally along the rails;

Fig. 6 is a diagrammatic end view of a locomotive or other rolling stock and illustrates in addition the mounting of my shock absorbers between the sprung and the unsprung masses;

Fig. 7 is a graphical representation of the tracking characteristics of a locomotive;

Fig. 8 illustrates the damped lateral oscillations of a locomotive running below the "critical speed" of the locomotive;

Fig. 9 represents the damped lateral oscillations of a locomotive provided with a shock absorber running below the "critical speed of the locomotive";

Fig. 10 illustrates the undamped and sustained lateral oscillations of the unsprung mass of the locomotive without a shock absorber running above the "critical speed" of the locomotive;

Fig. 11 illustrates a damped lateral oscillation of a locomotive provided with a shock absorber running at the "critical speed" of the locomotive; and, Fig. 12 represents the lateral oscillations of the sprung mass of a locomotive provided with a shock absorber running above the "critical speed" of a locomotive, wherein the amplitude of the lateral oscillations is not totally damped, but are stable at some predetermined low value.

Figure 1:
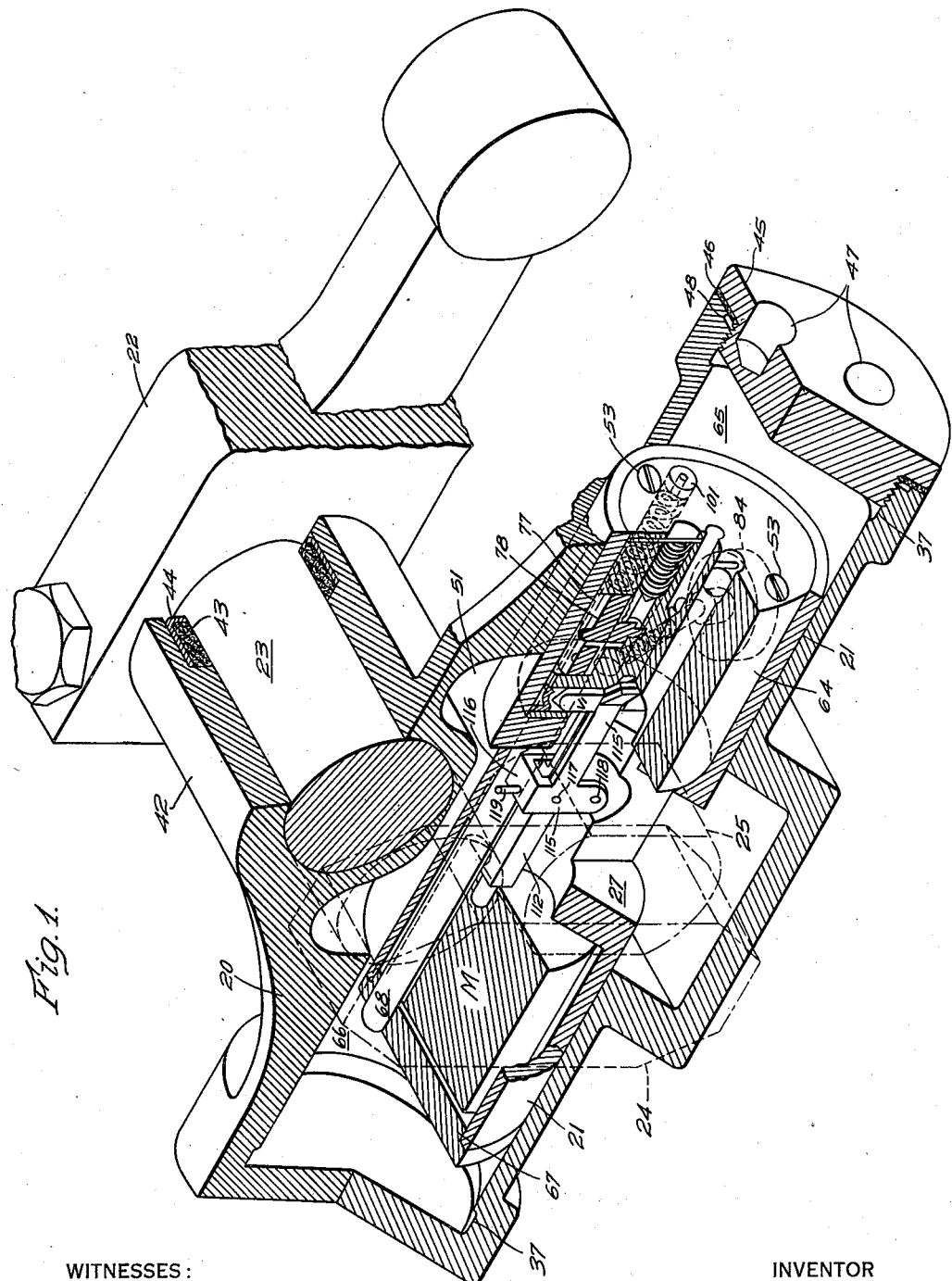
Figure 1 is a perspective cross sectional view of my shock absorber, the driving crank being shown by dot and dash lines.

Referring particularly to Fig. 1 of the drawings, my shock absorber comprises, in general, a cylinder 20 which is adapted to be mounted on the sprung mass of the locomotive, a two-way piston 21 having, as shown, the right end hollowed out to receive a valve assembly block 64, and having the left end hollowed out to receive a control mass M, two multiplying valves mounted within the valve assembly block 64, a plurality of fluid passages and associated ball and check valves, a rock shaft 23, which, together with a trunnion 26 and an arm 25, actuates the two-way piston 21 within the cylinder 20 upon the relative movements of the sprung and the unsprung masses of the locomotive.

As best shown in Fig. 1, the cylinder housing 20 extends outwardly towards the axle arm 22 to form a shoulder 42 for the purpose of providing a relatively long bearing surface for the rock shaft 23. As illustrated, the shoulder 42 is recessed to receive packing material 43 which may be securely held in place by means of a retaining washer 44. The washer and packing prevent leakage of the liquid from the housing 20.

The depending arm 25 operates in a space along the side of the two-way piston 21. The piston 21 may thus be caused to move in the cylinder 20.

As illustrated, the two-way piston 21 is, of course, shorter than the bore of the cylinder 20. Accordingly, this construction provides chambers 65 and 66 on opposite ends of the two-way piston 21 for subjecting a fluid contained therein to pressure to resist the relative movements of the sprung and the unsprung masses of the vehicle. The cylinder 20, at the extreme ends of the bore, is somewhat enlarged at 37 to facilitate the machining of the bore of the piston.

For controlling the movement of a fluid through the fluid passages in the valve assembly block, two multiplying valves, as $V_1$ are mounted in the block 64, which block is mounted in the hollowed out portion of the piston 21. The piston is provided with suitable conduits to permit the flow of fluid from the compression chamber past the valves controlled by the mass M.

The mass M is mounted in a balanced position and operates two levers which control the multiplying valves. Lever 115 is pivoted at 118 and lever 112, secured to the mass M, is pivoted at the point 117 on a U-shaped portion of the lever 115. The right-hand ends of the levers control the multiplying valves.

In view of the connection of the levers the mass M controls the valves as a function of both the vertical acceleration of the sprung mass of the locomotive and the rate of change of relative movement of the sprung and unsprung masses.

In Fig. 2, I show a part of an electric locomotive in combination with a shock absorber embodying the features of my invention. The cylinder 20 of the shock absorber is bolted or otherwise suitably connected to the superstructure of the sprung mass of the locomotive. The axle arm 22 of the shock absorber is connected to a bracket 120 that is attached to the journal box of the unsprung mass of the locomotive. As is well known in the art, the primary purpose of a spring equalization system is, in the case of uneven track, to equally distribute the weight of the sprung mass of a locomotive upon the wheels, and thereby insure substantially uniform traction between each driving wheel and the rails. If it were not for the spring equalization system, which allows the wheels to move freely up-and-down, one or more of the main driving wheels would, at every irregular place in the tracks, be lifted from the tracks. Therefore, it is obvious that for a shock absorber to be operative for locomotive use, it must in no way interfere with the function of the spring equalization system.

However, as will appear later in the description, while the spring equalization system allows the free movement of the wheels and thus uniform traction between all the driving wheels and the tracks; yet the elasticity of the springs in combination with the sprung mass of the locomotive is the primary cause of the "nosing" action of a locomotive. The undesirable "nosing" actions, that is the lateral oscillations of the unsprung mass of a locomotive, which is closely accompanied with the "rolling" action of the sprung mass of the locomotive, is the principal factor or condition that limits the safe maximum running speed of a locomotive.

My shock absorber, when mounted on a locomotive, provides for greatly reducing the "nosing" action of the unsprung mass of the locomotive, as well as for causing no interference with the spring equalization system.

In considering the tracking characteristics of a locomotive, let us assume first that the locomotive is moving along a straight track. If some transient disturbance, such, for example, as a crooked place in the track, causes the center line of the locomotive to assume an angular position relative to the center line of the track, the locomotive will travel in the direction of its own center. The angular position of the center line of the locomotive relative to the center line of the track, together with the forward (or backward) longitudinal movement of the locomotive, causes the locomotive to run across the track until the flanges of the leading wheels strike the rail. The impact of the flanges striking the rail turns the locomotive and thus causes the locomotive to run back to the other side of the track. This lateral motion of the wheels running from one side across to the other is called "nosing" of the unsprung mass of a locomotive. Therefore, it is noted, from the foregoing, that the "nosing" action comprises essentially two main motions:

(1) A rotational movement about a vertical axis through some point in the center line of the locomotive, which rotational movement, when superposed on the forward longitudinal motion of the locomotive, produces (2) a lateral motion of the said point about which the rotation takes place. This point will hereinafter be referred to as the "center of rotation" of the locomotive. It should be noted, however, that this use or denotation of the term differs somewhat from the conventional denotation of the term because, according to its conventional use, the center of rotation is the point on a rotating body which has no lateral motion. For a locomotive, the center of rotation has no lateral motion resulting from the rotational movements of the locomotive but it does have lateral motion resulting from the forward longitudinal movement of the locomotive. Therefore, from the foregoing, it is observed that if the center line of the locomotive is not allowed to assume an angular position with respect to the center line of the track, the undesirable "nosing" action can not exist. As will later appear in the description, my shock absorber functions to prevent the center line of the locomotive from assuming an angular position relative to the center line of the track.

The phenomenon of "nosing" may best be understood by assigning symbols to the various conditions affecting "nosing" action and expressing their relationship mathematically.

Thus let:

$a$=the variable angle between the center line of the locomotive and the center line of the track.

$A$=the maximum value of "$a$" during a cycle of the lateral oscillation of the unsprung mass of the locomotive.

$V$=the longitudinal velocity of the locomotive.

$f$=the frequency of the lateral oscillation.

$w=2\pi f$ $t$=time $y$=lateral displacement of the center of rotation.

Thus, the value of "a" may be also expressed generally by the following expression:

$$a = A \cosine wt$$

Since the value of the sine for small angles is substantially equal to the value of the angle in radians, the lateral displacement of the center of rotation may be expressed as follows:

$$y = \int_0^t Va\, dt = VA \int_0^t \cosine wt\, dt = \frac{VA}{w} \sine wt \quad (1)$$

or $$y_{max} = \frac{VA}{w} \quad (2)$$

From Equations (1) and (2), it is noted that:
(1) The lateral motion of the center of rotation is about 90° out of phase with the angular rotation about the center
(2) The amplitude of the lateral motion of the center of rotation is $$\frac{2VA}{w}$$

Therefore, to describe the lateral motion of any point on the center line of the locomotive, the motion resulting from the rotation of the center line must be added vectorially to the lateral translation of the center of rotation. For example, suppose that a two axle locomotive is rotating about a point midway between the axles (see the diagrammatic view in Fig. 4) and that, at the same time, the locomotive is moving longitudinally along the tracks. By letting $x_1$ and $x_2$ be the longitudinal distances between the center of rotation and the front and rear axles, respectively, then $x_1A$ and $x_2A$ equal the lateral movement of the front and rear axles resulting from the rotational movement of the locomotive about the center of rotation. From Equation (1) it is noted, however, that the lateral motion of the axles resulting from the rotation, is 90° out of phase with the lateral motion resulting from the longitudinal movement of the locomotives. This vector condition is shown vectorially in Fig. 4. Also, the vector condition of one axle only is shown graphically in Fig. 5.

The amplitude $$\frac{C}{2}$$

of the resultant curve of Fig. 5, or length of the resulting vectors $$\frac{C}{2}$$

of Fig. 3, represents the width of one-half of the total clearance between the flanges of the wheels and the rails, or the amplitude of the resultant lateral motion of the wheels.

By letting $\theta$ be the phase angle between the motion of the center of rotation and the motion of the front and rear axles, an expression for the total clearance, C between the flanges of the wheels and the rails may be written as follows:

$$C = \frac{2VA}{w \cosine \theta} \quad (3)$$

Thus:

$$A = \frac{Cw \cosine \theta}{2V} \quad (4)$$

Therefore, other quantities remaining constant, Equation (4) shows that the angularity A decreases as the speed of the locomotive increases. Accordingly, for very high speeds, the resultant motion consists mostly of lateral translation with very little rotation.

The disturbing force F, which causes the phenomenon of "nosing", is the frictional force between the threads of the wheels and the rails, which causes the locomotive to travel in the direction of its own center line rather than in the direction line of the track. Hence, the maximum value of this disturbing force F is the weight of the locomotive times the coefficient of friction between the threads of the wheels and the rails. The distance through which this force acts is $2y_{max}$, being the distance through which the center of rotation moves in its lateral oscillation, (see Fig. 5). The direction of this disturbing force F is determined by the motion itself. Therefore, the frequencies of the disturbing force and the motion is always equal. In other words, if there is some natural frequency at which the locomotive tends to oscillate, the natural frequency and the disturbing force will always be in resonance.

Inasmuch as the weight of the sprung mass is so much heavier than the unsprung mass of a locomotive, and inasmuch as the modulus of elasticity R of the rails is large compared to the modulus of elasticity K of the springs that support the sprung mass of the locomotive, the natural frequency of the locomotive is determined primarily by the combination of the sprung mass and the elasticity of the springs that support the sprung mass (see Fig. 6). Strictly speaking, this is an elastic system having two degrees of freedom; and, hence has two natural frequencies. Actually the stiffness of the rails is so much greater than the springs of the locomotive that the effect of the rails may be neglected.

As hereinbefore mentioned, by reason of the angularity A, between the center line of the locomotive and the center line of the track, the wheels run from one rail towards the other and back again. These lateral oscillations of the unsprung mass cause a corresponding lateral oscillation to be imparted to the sprung mass of the locomotive. However, by virtue of the spring that supports the sprung mass, the lateral oscillations of the sprung mass takes the form of a "rolling" action. That is to say, the sprung mass is displaced laterally while, at the same time, the springs on one side of the locomotive are deflected upwardly and the springs on the other side are deflected downwardly. The total inertia force P caused by the lateral accelerations of the sprung mass, may be considered, as applied at the center of gravity (see Fig. 6). The inertia force P applied at the center of gravity may be replaced by a lateral force P' of equal magnitude, applied at the axle and two equal and opposite vertical forces B applied at the springs of the locomotive which tend to rotate the sprung mass about the center of gravity. As is obvious, the lateral force P' tends to increase the angularity, A between the center line of the locomotive and the center line of the track. Then, an increase of the angularity A causes a corresponding increase in the frictional disturbing force F which, in turn causes an increase in the "rolling" action of the sprung mass and the accompanying increase in the inertia force P. This circuitous oscillatory action unless impeded by a resisting force, continues to build up to dangerous proportions, which, in cases of high speeds, becomes great enough to cause the lateral force P' to spread the rails and thus cause derailments and wrecks.

Accordingly the phenomenon of "nosing" may be characterized as "self induced" vibrations; that is to say, the disturbing force F furnishing the energy to the vibrations is controlled by the motion itself, in contradistinction to "force vibrations" where the disturbing force is independent of the motion. In Fig. 5, the maximum value of the disturbing force is represented by the line F being in phase with the curve $$a = A \text{ cosine } wt$$

Therefore, by letting Q equal the wheel loading; $n$ the number of axles, and $f$ the coefficient of friction, the disturbing force F equals $2nfQ$. The energy input during one cycle (four quarter-cycles) is $2nfQ$ times $4y_{max}$.

Substituting the value of $$\frac{VA}{w}$$

for $y_{max}$ the energy input tending to cause "nosing" becomes:

$$\text{Input} = \frac{8VAfQn}{w} \quad (5)$$

From Fig. 12, $$\text{cosine } \theta = \frac{VA}{w}\left(\frac{1}{\sqrt{\frac{V^2A^2}{w^2}+x_1^2A^2}}\right) = \sqrt{\frac{V^2}{x_1^2w^2+V^2}} \quad (6)$$

Substituting (6) in (4), the expression for A becomes:

$$A = \frac{Cw}{2V}\sqrt{\frac{V^2}{x_1^2w^2+V^2}} = \frac{Cw}{\sqrt{x_1^2w^2+V^2}} \quad (7)$$

Substituting (7) in (5), the expression for energy input for each cycle tending to cause "nosing" becomes:

$$\text{Input} = \frac{4CVfQn}{\sqrt{x_1^2w^2+V^2}} \quad (8)$$

The energy losses, which tend to minimize the "nosing" actions are mostly caused by the transverse sliding of the wheels upon the rails, as the locomotive oscillates about the center of rotation. The force of resistance at each wheel is $fQ$; and, from Fig. 4, the sliding distance through which this force acts is $x_1A$ and $x_2A$ for the front and rear wheels, respectively. The sliding distance may also be expressed as follows:

$$\text{Sliding distance} = A\sqrt{x_1^2 + \frac{(S)^2}{2}}$$

where "S" equals the track gage. Since the locomotive swings through the angle A four times in each cycle, the distance for each cycle is four times the above expression.

Therefore, the expression for the energy loss of a two-axle locomotive during each cycle becomes:

Energy loss = $(fQ)$ (2 wheels for each axle)

$$(4A)\left(\sqrt{x_1^2+\frac{S^2}{2}}+\sqrt{x_2^2+\frac{S^2}{2}}\right) \quad (9)$$

For a locomotive with any number of axles, Equation (9) may be generally expressed as follows:

$$\text{Energy loss} = 8AfQ\sum_n^1\sqrt{x^2+\frac{S^2}{2}} \quad (10)$$

Substituting (7) in (10) the final equation for energy loss is as follows:

$$\text{Energy loss} = \frac{4fQCw}{\sqrt{x^2w^2+V^2}}\sum_n^1\sqrt{x^2+\frac{S^2}{2}} \quad (11)$$

Therefore, the energy available to sustain and build up the oscillations may be obtained by subtracting Equation (11) from Equation (8). Thus:

$$\text{Input minus loss} = \frac{4CfQ}{\sqrt{x^2w^2+V^2}}\left[Vn - w\sum_n^1\sqrt{x^2+\frac{S^2}{2}}\right] \quad (12)$$

Equation (12) becomes zero when $$V = \frac{w}{n}\sum_n^1\sqrt{x^2+\frac{S^2}{2}} \quad (13)$$

If the value of V is less than the right hand side of the Expression (13), the net energy is negative; and therefore, any lateral oscillations of the unsprung mass of a locomotive that starts will be quickly damped out. Conversely, when the value of $V_1$ is greater than the right hand side of the Expression (13), energy is available to sustain and increase any lateral oscillations of the unsprung mass of a locomotive that starts. Therefore, the value of V given in Equation 13 may be considered as a "critical speed" below which lateral oscillations of the unsprung mass of a locomotive cannot occur, and above which lateral oscillations can occur. This condition is shown graphically by curves I and II of Fig. 7. The frictional loss curve I drops while the energy input curve II increases as the speed increases, for the reason that the angularity A, which determines the frictional loss, decreases as the speed increases, and the lateral displacement $y_{max}$, which determines the energy input increases as the speed increases. The vertical line at 53 miles per hour represents the critical speed of the locomotive. For speeds below the "critical speed", the frictional losses of the unsprung mass of the locomotive (see curve I) is greater than the energy input of the unsprung mass of the locomotive (see curve II). Consequently, for speeds below the "critical speed" any lateral oscillations of the unsprung mass that start are quickly damped out. For speeds above the "critical speed", the reverse condition is true, and thus energy is available to sustain the lateral oscillations of the sprung mass of the locomotive (see shaded portion between curves I and II).

However, by mounting shock absorbers, constructed in accordance with my invention, between the sprung mass and the unsprung mass substantially no energy is available to sustain the lateral oscillations of the unsprung mass of the locomotive.

My shock absorber, when mounted on a locomotive provides for resisting the "rolling" action of the sprung mass, for the reason that the control-mass M is responsive to the vertical component of the "rolling" action. Thus, under the condition represented in Fig. 6 the shock absorber on the right side of the sprung mass resists the downward component of the "rolling" action and the shock absorber on the left side resists the upward component of the "rolling" action. When the force P reverses, the opposite condition is true. This means that the magnitude of the lateral force P applied at the center of gravity of the sprung mass is reduced to a very low value. This reduction in turn, causes the lateral force P', applied to the axle of the unsprung mass, to be accordingly reduced to a very low value, with the result that the angularity A between the center line of the locomotive and the center line of the tracks is, under all speeds of the locomotive reduced substantially to zero. Therefore, my shock absorber, when applied to a locomotive, prevents the "nosing" action of the locomotive for all speeds.

In Figs. 8 to 12, inclusive, I illustrate the lateral oscillations of the unsprung masses of a locomotive with and without a shock absorber. In all of these cases the track is presumed to be straight and the magnitude $$\frac{C}{2}$$

of the first lateral oscillation is the same. Fig. 8 represents the lateral oscillations of the unsprung mass of a locomotive without any shock absorber below the critical speed. This lateral oscillation becomes damped, for the reason that the frictional losses of the unsprung mass of the locomotive are greater than the energy input of the unsprung mass.

Fig. 9 represents the same condition as Fig. 8, except that the locomotive is provided with shock absorbers. In this case the lateral oscillations are damped somewhat quicker, since my shock absorbers add to the damping action caused by the frictional losses of the unsprung mass.

The lateral oscillation represented by curve in Fig. 10 is for a locomotive having no shock absorber running above the critical speed. In this case energy is available to sustain the lateral oscillation of the unsprung mass, and as a result the amplitude builds up to large proportions, thus causing corresponding large lateral forces on the rails.

Fig. 11 represents the same condition as Fig. 12 except that the locomotive is provided with a shock absorber in which the resisting force of the shock absorber is sufficiently large to totally damp the lateral oscillations of the unsprung mass of the locomotive to zero.

Fig. 12 represents the same condition as Figs. 10 and 11 except that the locomotive is provided with a shock absorber in which the resisting force of the shock absorber is not quite sufficiently large to totally damp out the lateral oscillations of the unsprung mass of the locomotive. In case the amplitude of the lateral oscillations is readily damped down to a very low value at which point they become stable.

Therefore, by utilizing shock absorbers on high speed trains the possibility of the rails spreading and thus causing injury to passengers and damage to the rolling stock, is totally avoided, even at speeds greatly in excess of 100 miles an hour or more. Another beneficial result is that the maintenance of the rails and road bed are materially reduced. If high speed locomotives are allowed to exert high lateral forces upon the rails, as a result of an undamped "nosing" action, the rails, after they are used a short period become warped, which, in turn, causes the "nosing" action to become worse. This action is cumulative and in some cases the track, if not properly maintained, becomes excessively crooked, taking the form of a substantially sinusoidal path. This will be greatly avoided by the action of my shock absorbers which keep the lateral forces of the unsprung mass to a very low minimum.

Therefore, I have disclosed a shock absorber mounted on a locomotive, which shock absorber provides for reducing the angularity between the center line of the locomotive and the center line of the track, and thereby materially reduces the "nosing" action of a locomotive to substantially nothing.

I claim as my invention:

1. An inertia controlled shock absorber for a rail vehicle connected between the sprung and unsprung masses of a rail vehicle adapted to produce a resisting force to relative movements of the sprung and unsprung mass of a value determined by the rate of change of velocity of the sprung mass relative to the unsprung mass to thus reduce the "nosing" action of the vehicle.

2. In a rail vehicle having a sprung and an unsprung mass in which the unsprung mass of the vehicle is constrained to travel on a track having limited lateral clearances, thus permitting the center line of the vehicle to assume an angularity with the center line of the track and in which the sprung mass of the vehicle, by reason of the angularity, is caused to produce a "rolling" action and thereby increase the angularity, which, in combination, with the "rolling" action produces sustained lateral oscillations of the unsprung mass of the vehicle, an inertia shock absorber connected between the sprung and unsprung masses of the rail vehicle and that is thus responsive to the "rolling" action of the sprung mass of the vehicle to thus counteract such rolling action by a force determined by the rate of change of velocity of the sprung mass during rolling to thus reduce the angularity and thus limit the amplitude of the lateral oscillations of the unsprung mass of the vehicle to a low value.

3. In a rail vehicle having a sprung mass and an unsprung mass and in which, as is necessary for rail vehicles, the unsprung mass is constrained to travel on a track having limited lateral clearance, in combination, an inertia controlled shock absorber comprising a member connected to the sprung mass, a second member connected to the unsprung mass, and inertia controlled means adapted to vary the damping force of the shock absorber as a function of the relative movement of the sprung and unsprung masses of the vehicle, whereby the tracking characteristics of the vehicle are improved.

4. In a rail vehicle having a sprung mass and an unsprung mass and in which, as is necessary for rail vehicles, the unsprung mass is constrained to travel on a track having limited lateral clearance, in combination, an inertia controlled shock absorber comprising a member connected to the sprung mass, a second member connected to the unsprung mass, inertia means mounted on the sprung mass and adapted to resist relative movement of the sprung and unsprung masses as a function of the movement of the sprung mass whereby the tracking characteristics of the vehicle are improved.

5. In a rail vehicle having a sprung mass and an unsprung mass and in which, as is necessary for rail vehicles, the unsprung mass is constrained to travel on a track having limited lateral clearance, in combination, an inertia controlled shock absorber comprising a member connected to the sprung mass, a second member connected to the unsprung mass, inertia means operable by the upward vertical movement of the sprung mass to resist the relative movement of the sprung and unsprung masses as a function of the rate of change of upward vertical velocity of the sprung mass, whereby the tracking characteristics of the vehicle are improved.

6. In a rail vehicle having a sprung mass and an unsprung mass and in which, as is necessary for rail vehicles, the unsprung mass is constrained to travel on a track having limited lateral clearance, in combination, an inertia controlled shock absorber comprising a member connected to the sprung mass, a second member connected to the unsprung mass, inertia means operable by the upward vertical movement of the sprung mass and the relative movement of the sprung mass and unsprung mass when the unsprung mass is either vertically stationary or moving vertically upwardly only, to thus improve the tracking characteristics of the vehicle.

CLINTON R. HANNA.